United States Patent [19]

Dickey et al.

[11] 4,397,100

[45] Aug. 9, 1983

[54] ORGANIC SOLID SUBSTRATE DEWATERING PROCESS BASED ON PLUG FLOW CONTACT BY AN EXTRACTIVE FLUID

[75] Inventors: Leland C. Dickey; Maya Tayter, both of Omaha, Nebr.

[73] Assignee: InterNorth, Inc., Omaha, Nebr.

[21] Appl. No.: 327,610

[22] Filed: Dec. 4, 1981

[51] Int. Cl.³ .......................... F26B 3/00; B01D 23/00
[52] U.S. Cl. ........................................... 34/9; 210/476
[58] Field of Search ............................... 34/9; 210/476

[56] References Cited

U.S. PATENT DOCUMENTS

| 3,327,402 | 6/1967 | Lamb et al. | 34/9 |
| 4,026,790 | 5/1977 | Moore | 210/634 |
| 4,339,882 | 7/1982 | Dickey et al. | 34/9 |

*Primary Examiner*—John J. Camby
*Attorney, Agent, or Firm*—Donald F. Haas

[57] ABSTRACT

A method of removing water from organic solid substrates, such as peat, wherein a primary solvent is used to extract water from the substrate and the primary solvent and the substrate are kept in plug flow during contact, and then a secondary solvent may be used to separate the primary solvent from the water.

17 Claims, 6 Drawing Figures

ORGANIC SOLID SUBSTRATE DEWATERING PROCESS BASED ON PLUG FLOW CONTACT BY AN EXTRACTIVE FLUID

BACKGROUND OF THE INVENTION

This invention relates to a process for separating water from, or dewatering, organic solid substrates which contain significant amounts of water. The method has specific relevance to fossilized biomass materials such as peat and coal but also is applicable to other biomass substrates such as agricultural and forestry residues (bagasse, corn stover, sawdust, etc.), groups deliberatey grown for their fuel or chemical value, and sewage sludge. The present invention provides an energy efficient method for removing water from these materials prior to their ultimate use of interim conversion. Since the production of energy or fuel is generally the ultimate use for these substrates, an energy efficient dewatering process could be mandatory for those containing a relatively great amount of water. It is quite likely that the invention concept will be applied to solid/liquid separations other than those described above since nothing in the concept of plug flow contacting restricts its use to water or aqueous fluids. Because of the relatively great amount of energy required to evaporate water, compared for example, to hydrocarbons, dewatering processes benefit most by use of the invention rather than evaporative separation methods.

Water laden materials can often be dewatered by compression, the applicability of which is dependent upon the solid structure of the material. The predominant effect of compressive loading on water laden substrates of the type considered here is compaction of the solid structure which reduces the void volume available to the water. Material with a rigid structure, such as a particulate mixture with a wide size distribution, is usually difficult to compress. Peat, for example, can be economically dewatered down only to about 75% moisture content by mechanical squeezing.

A commonly used method of dewatering material such as filter cakes is air displacement. This method is most applicable to materials with an open and uniform pore structure. It is very difficult to displace water from the finer void spaces using air because of the tendency for bypassing through the larger channels.

Nonaqueous liquid displacement of water from a porous material has been used commercially only rarely and then with materials that have high value compared to the biomass and similar type substrates considered here. The main drawback to solvent dewatering is the high cost of solvent recovery and/or loss relative to the product. Our copending patent application, *Organic Solid Substrate Dewatering Process Utilizing Primary and Secondary Solvents,* Ser. No. 280,264, filed July 2, 1981, now U.S. Pat. No. 4,339,882, typifies interest in liquid dewatering brought about by the high energy cost of conventional dewatering methods.

Liquid extraction, which is the commonly used and well understood separation process most similar to dewatering by solvent displacement, occurs by bringing about contact between differing liquid phases (one possibly intermixed or associated with a solid) so that a redistribution of the components in the original phases will occur. Design of contacting devices for liquid extraction is based on the definition that an equilibrium distribution, the ultimate product of perfectly intimate contacting, will be achieved from a single perfect contacting stage, (see for example, Treybal, *Mass Transfer Operations,* Ch. 10—Liquid Extraction). It is well known, however, that for packed columns, such as are commonly used in chromatographic equipment, much better separation can be achieved than would be expected if one assumed the column to be a single equilibrium stage. This is explained in chromatographic theory by showing that the moving zone of contact does not reach equilibrium in the sense generally used in chemical engineering unit operations. This invention demonstrates that a similar phenomena can be used in a liquid displacement dewatering process, especially when used in combination with an energy efficient liquid separation method.

SUMMARY OF THE INVENTION

The present invention relates to a method of removing water from organic solid substrates such as peat, coal, conventional biomass materials, municipal trash, and sewage. The method comprises contacting the substrate with a solvent to remove at least a portion of the water therefrom in relatively pure form, and separating the substrate from the mixture of solvent and water. This invention specifies the most advantageous manner of contacting the solid substrate with the solvent. Contrary to the usual expectation of liquid/liquid extraction or leaching practice it is not desirable to agitate the zone of substrate-solvent contact nor allow long periods of static contact that lead to an equilibrium distribution of water between the substrate and fluid phases. It has been discovered that by keeping each phase in plug flow during contact, a displacement of the water originally present in the substrate can be achieved such that a substantial fraction of the displaced water will be of relatively high purity. Separating a substantial fraction of the water in relatively pure form reduces the quantity of solvent needed to dewater a given quantity of substrate, thereby reducing equipment costs for contacting and more importantly reducing the solvent/water separation costs. In the preferred embodiment, a secondary solvent is used to recover the organic solid, or primary, solvent from the mixture with water as disclosed in our above-mentioned copending application.

DETAILED DESCRIPTION OF THE INVENTION

The present invention relates to an energy and cost efficient method of removing water from organic solid substrates, especially peat, coal, and biomass materials.

These solids commonly have a high moisture content which must be reduced before they can be efficiently used as a fuel source, a chemical source, or disposed of, as the case may be. The method is also useful for removing other liquids from organic solid substrates.

In the method of this invention, the organic solid is first contacted with a solvent which removes at least a large portion, if not all, of the water contained in the substrate. The substance of this invention is specifying the preferred manner in which the solvent contacts the solid. Experimentation has revealed to us that by keeping both solvent and solid in plug flow a separation of the water and solid can be achieved wherein a major portion of the water is unmixed with the solvent despite the fact that the water and solvent are necessarily (for success of the method) miscible.

By plug flow we mean that elements of a moving phase move at the same velocity through a particular space and, therefore, elements of different residence time in a contact zone are not mixed. The simplest way to obtain dual plug flow contact between two phases is to keep one phase stationary and drive the other through it at sufficient velocity that momentum in the flow direction greatly exceeds the turbulence generating forces that would tend to promote mixing of fluid elements at different distances in the flow direction, so-called axial mixing for cylindrical geometry. When the stationary phase is solid and the fluid phase is of low viscosity, such as in chromatographic columns, the condition can be achieved most easily since the solid will not be disrupted at flow velocities sufficient to preclude significant axial mixing.

Our experiments have shown that for certain organic substrates, such as peat, water can be removed by chromatographic-type displacement using a relatively low flow rate of water-miscible solvents. A large amount of water can be removed by solvent drainage through vertical, cylindrical columns packed with the substrate, which is stationary. A continuous process, which is desirable for commercial dewatering, would have both substrate and solvent moving in plug flow through a contacting zone thereby producing the essential conditions for dewatering.

Figure 1:
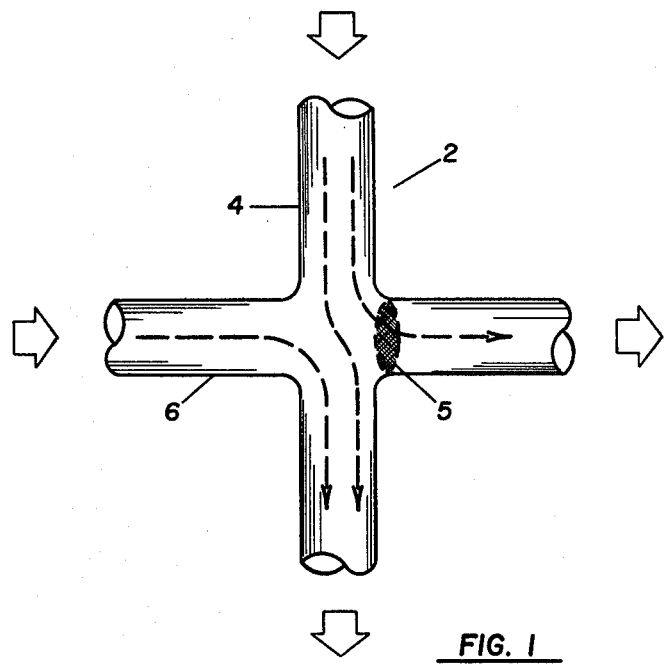
FIG. 1 shows a simple pipe cross apparatus for contacting the organic solid with the solvent.

FIG. 1 illustrates the simplest embodiment of the present invention which is comprised of a pipe cross 2 wherein the solid organic substrate descends vertically through the vertical arm 4 and contacts the solvent which is flowing through the horizontal arm 6. The point where the two arms cross defines the contact zone. The water originally contained in the substrate is expressed through the liquid permeable barrier 6 opposite the entering solvent. The substrate, with solvent replacing much of the water originally contained therein, descends out through the bottom of the vertical arm 4. Other designs like this are possible, including one produced by rotating the aforementioned design 90°.

Figure 2:
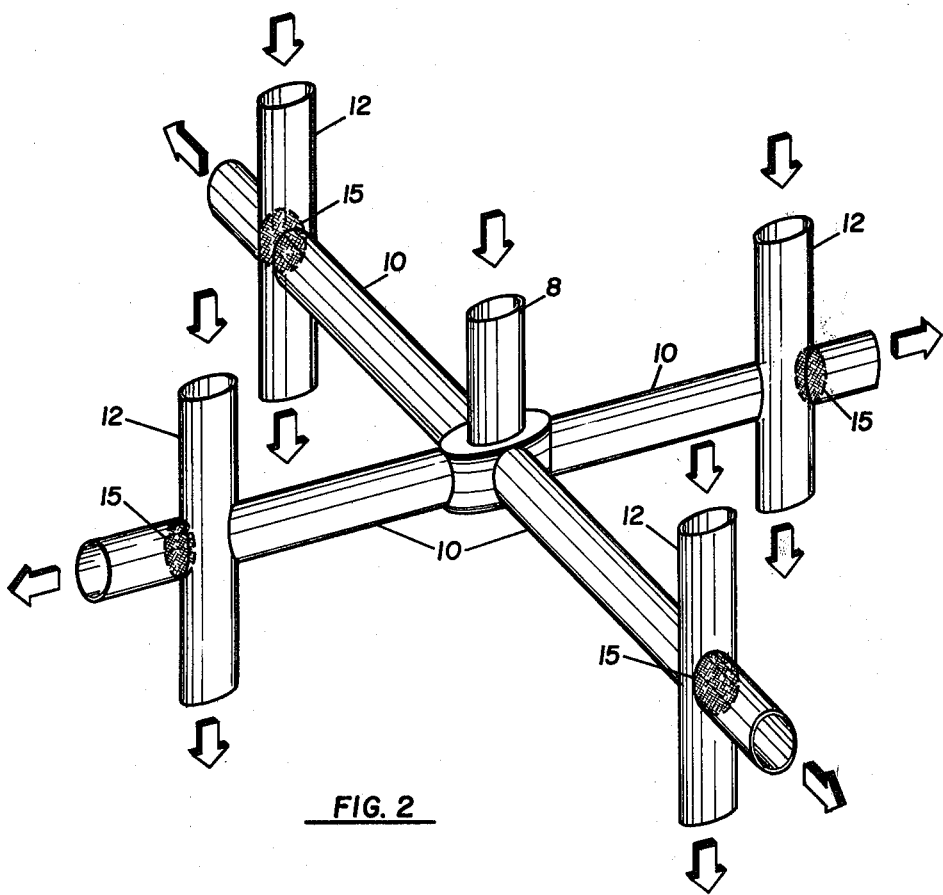
FIG. 2 shows a multiple cross apparatus for the same purpose.

FIG. 2 illustrates a more complex version of the simple pipe cross apparatus. Solvent enters the central manifold 8 and flows radially through the four horizontal arms 10. The organic substrate descends vertically through the four vertical tubes 12. The contact zone is at the point where the horizontal arms 10 cross the vertical tubes 12. The water is expressed radially out of the system through the liquid permeable barriers 15 and the substrate, with solvent replacing much of the water originally contained therein, descends vertically out of the system through the bottom of the vertical tubes 12. This embodiment of the invention could contain more or less horizontal arms 10 and vertical tubes 12.

Figure 3:
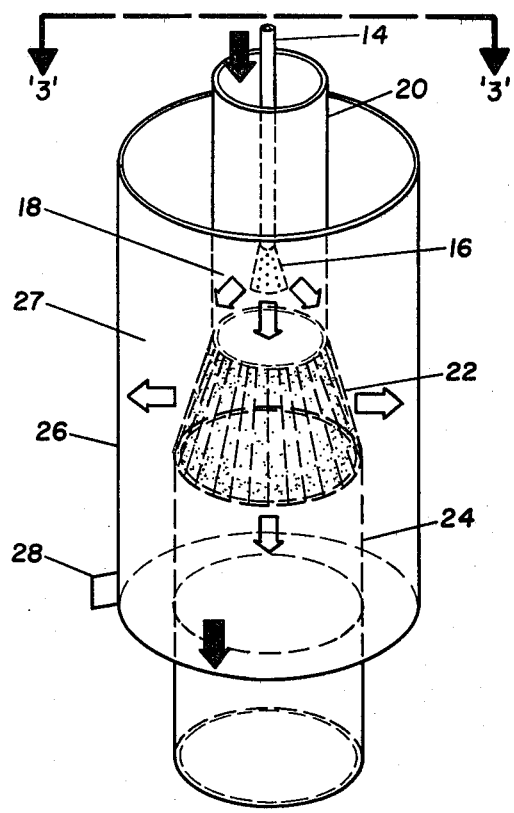
FIG. 3 shows an apparatus capable of continuous operation having a central solvent feed tube disposed within an annular space for the organic substrate, and both being surrounded by an outer annulus into which the water-rich liquid would drain.
Figure 4:
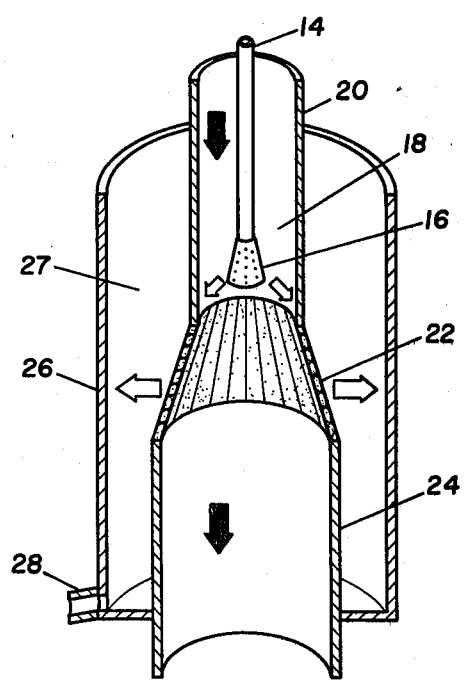
FIG. 4 shows a sectional view of the apparatus of FIG. 3 taken across line 3—3.

FIGS. 3 and 4 illustrate an apparatus which allows continuous use of the process of the present invention. The solvent enters the apparatus through central feed tube 14, the bottom tip 16 of which is liquid permeable. The organic substrate descends vertically through the inner annulus 18 which is comprised of an upper cylindrical section 20, a central frustoconical section 22, and a lower cylindrical section 24. An outer cylinder 26 is disposed around the inner annulus 18 for the collection of water. The solvent flows out of the tip 16 in a radial direction, contacts the organic substrate, and then begins to descend vertically with it. The central frustoconical section 22 of the inner annulus 18 is comprised of a liquid permeable structure, such as a screen or mesh material. The water from the organic substrate is expressed through the openings in the material of the central frustoconical section 22, collects in the outer annulus 27 and then drains out the outlet 28.

Figure 5:
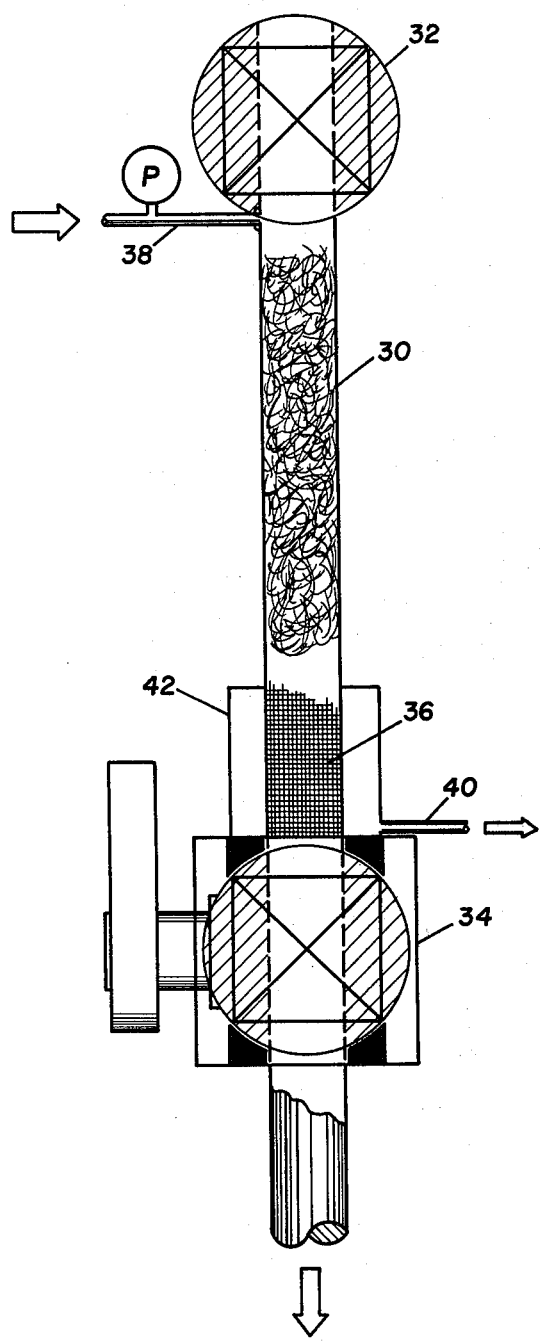
FIG. 5 shows an apparatus for semi-continuous dewatering.

FIG. 5 illustrates an apparatus for semi-continuous dewatering. It is comprised of a column 30 which has an upper valve 32 to allow solid loading by gravity feed from an overhead bin (not shown), followed by pressurization of the filled column, and a lower valve 34 (which could be a ball or gate valve) to allow passage of dewatered solid after the efflux of water. The lower section 36 of the column 30 is made of a liquid permeable material which will allow the passage of water while preventing the passage of the organic solid. The solvent enters the column through inlet 38, the water leaves the column through outlet 40, and the organic solid, from which most of the water has been removed, passes through the valve 34 when it is opened and out of the bottom of the column 30. To use this apparatus, the lower valve 34 must first be closed. Then the top valve 32 is opened and the column 30 is filled with the organic substrate. The top valve 32 is then closed and the solvent flows into the column 30 through the solvent inlet 38. A moderate amount of air pressure is applied to the column 30 (two atmospheres would be appropriate for many materials). The solvent is allowed to flow vertically downward through the orgaic solid in the column 30. The water from the organic solvent is expressed outward through the liquid permeable section 36 of the column 30, collects in the water collection chamber 42, and then leaves the apparatus through the water outlet 40. When the solvent reaches the section 36 of column 30, the lower valve 34 is opened and the solvent and organic solid are allowed to descend vertically out through the bottom of the column 30.

Figure 6:
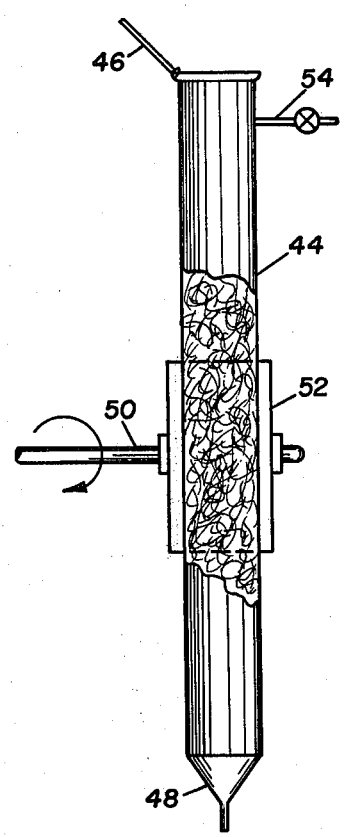
FIG. 6 shows a rotatable apparatus for batch dewatering.

FIG. 6 illustrates a rotatable apparatus for batch dewatering. It is comprised of a rotatable column 44 having a lid 46 at the top end, and a port 48 at the bottom end. A motor (not shown) for rotating the apparatus is rotatably connected to rod 50 which is connected to clamp 52 surrounding and attached to the rotatable column 44. The lid 46 is opened, and the solids are loaded through the top of the rotatable column 44. Then the lid 46 is closed, and solvent flows into the column 44 through the solvent inlet 54. A pressure (approxiate to the material and scale of operation) is applied. The solvent descends vertically through the column 44 and the water is expressed vertically downward through the bottom port 48. When the solvent begins to come through the bottom port 48, the motor is activated and the rotating action of the rod 50 on the clamp 52 causes the column 44 to flip over. Then the lid 46 is opened and the dewatered solids are allowed to fall out. The advantage of this embodiment is that it eliminates the bottom valve shown in FIG. 5 which can clog when organic solids flow through it. Consequently, it is possible to operate the process at higher pressures since the solid outlet is of a simpler type.

For best results in the contacting of the organic solid with the solvent, the weight ratio of solvent to water should be 1:5 to 3:1. If the ratio is less than 1:5, then insufficient water will be removed from most conversion processing and a ratio of more than 3:1 is not necessary because an excessive amount of mixture separation and solvent recirculation is necessary.

The next step is separating the solid from the mixture of solvent and water. This can be accomplished by any convenient means such as draining or pressing which may be easier after the addition of the solvent because of disruption of the solid/water structure as disclosed in U.S. Pat. No. 4,014,104. The preferred method is draining and then pressing because that gives a good substrate for further processing but it depends on the particular final product desired. The relatively small amount of residual solvent in the substrate can be removed by any convenient method such as evaporation.

In the preferred embodiment of the invention, the third step, but one which proceeds parallel to the preceding in the sense of a flow scheme, is separating the solvent that may have been carried out with the water. One way is contacting the mixture of solvent and water with a secondary solvent. The secondary solvent must be miscible with the organic solid, or primary, solvent and preferably not with water. For best results, the weight ratio of primary solvent to secondary solvent should be 2:1 to 1:2 per stage. If the ratio is less than 1:2, an excessive number of stages will be needed, and if the ratio is more than 2:1, an excessive amount of secondary solvent is necessary. When the three components are in the correct proportions, two phases will result. One will be mostly water and the other will be a mixture of primary solvent and secondary solvent.

The two phases are separated in a settling vessel using the density difference of the phases. Finally, the primary and secondary solvents are separated. They are chosen such that this separation can be accomplished in an energy and cost-efficient manner. Preferred methods for accomplishing this separation are distillation or freezing depending on the particular solvents selected.

The primary solvent may be any liquid compound, preferably an organic compound, which is miscible with water, will not dissolve the biomass substrate from which the water is being removed, and which is miscible with the secondary solvent referentially to water. The following compounds are suitable for extracting water from biomass substrates including peat and sewage sludge. The list is representative and many compounds by way of substituent additives or isomeric variation are also suitable. Expensive, corrosive, or foul-smelling compounds have not been included even though some of them might be usable with appropriately modified extractor designs.

Alcohols are especially suitable for use as the primary solvent in the present invention. Monohydroxy, $C_1$ to $C_{20}$, dihydroxy $C_2$ to $C_5$ including glycols such as ethyl glycol and propylene glycol, and trihydroxy $C_3$ to $C_5$ are all suitable compounds. Generally, as the chain length is increased, more hydroxy or other polar substituent groups are required to achieve miscibility with water. Ketones are also suitable for use as the primary solvent. Various $C_2$ to $C_4$ ketones such as acetone, diacetone, alcohol, and 3-hydroxy-2-butanone are examples of such compounds. Aldehydes can also be used. $C_2$ to $C_4$ aldehydes such as 3-hydroxybutanol and 1-aminobutanol are suitable. Straight chain and ring compound ethers are suitable as the primary solvent also. $C_4$ to $C_8$ ethers such as dioxane, dioxolane, morpholine, diethylene monobutyl ether, 1-hydroxylacetone, dimethyloxazole, butyrolacetone, valerolacetone, and pentenoic acid 4-hydroxylacetone are suitable examples. Carboxylic acids, especially $C_1$ and $C_7$ acids such as formic and acetoacetic acids can be used. Straight, ring and multiple ring amine compounds can be used because of the polar nature of nitrogen. The preferred amines are $C_2$ to $C_5$ such as benzylamine N-acetylethanolamine, t-butyl amine, diethylenetriamine, allylmethylamine, ketine, 3-methylpyrazole, diazine and pyrrolidine. There are a large number of amides which can be used because the polar nature of the nitrogen and oxygen atoms permit compounds with a larger molecular size to maintain water miscibility. Amides containing 1 to 8 carbon atoms are particularly suitable, for example, 2, 4-dinitroacetanilide and N, N-dimethylpentenoic acid amide. ene A wide variety of carboxylic acid esters can also be used. They follow the same pattern as that of the amides. Examples of such compounds are ethylglycinate, tetrahydrofurfuryl acetic acid ester and carbitol acetate. In addition to the above, there are a small number of compounds which are not represented by a substantial class. Examples are acetonitrile, various imines, azirane and azetidine. It should be noted that the preferred solvents for use in the present invention are methanol, ethanol and propanol because of their low cost and availability.

The secondary solvent must have the following characteristics: miscibility with the primary solvent, immiscibility with water, and easy separability from the primary solvent. There are a great many compounds which satisfy these three criteria. These can be established by experimentation or it can be predicted using a group contribution model such as discussed in "Group-Contribution Estimation Of Activity Coefficients In Non-Ideal Liquid Mixtures", [AIChE Journal, Volume 21, No. 6, pages 1086–1099 and "A Group Contribution Molecular Model Of Liquids and Solutions", *AIChE Journal*, Volume 23, No. 2, pages 144–160. These models allow the prediction of the behavior of liquid mixtures by combining the effect of the chemical groups present in the mixture. Five main groups ($CH_3$, $CH_2$, CO, OH and $H_2O$) and their interactions have been characterized using property measurements of a number of pure compounds and mixtures. The preferred secondary solvent is 1-decanol, but octanol, linoleic acid, and tributyl phosphate, among others, are also very suitable for use in the present invention.

The primary and secondary solvents may be separated by any convenient method. It is preferred that the method be both energy and cost-efficient. Freeze separation is one such method. In this method, the mixture would be fed to a chilled vessel and the solvent with the higher fusion temperature frozen and separated by conventional means. Another suitable method of separation is parametric pumping (cyclic circulation through a packed column which is selectively absorptive and whose selectivity can be altered by changing an intensive column parameter).

After the mixture of primary solvent and water is removed from the biomass substrate, there is likely to be a residual amount of primary solvent remaining in the substrate. If it is desired, this material can be removed from the substrate by any convenient method such as evaporation or pressing, if possible.

EXAMPLE 1

100 gm of peat containing 76 weight percent water was packed into a 4 cm diameter glass column to a density of 0.71 gm/cm$^3$. 200 gm of normal propanol was drained through the column if plug flow and samples of the liquid mixture draining through were collected and the composition determined. After 30 minutes 30 gm of liquid was collected containing 98 weight percent water.

EXAMPLE 2

The above experiment was repeated using pentane. No water was measured in the liquid draining through the packed column.

EXAMPLE 3

200 gm of peat containing 76 weight percent water was packed into a 4 cm diameter glass column to a density of 0.67 gm/cm$^3$. 400 gm of 1-propanol was drained through the column in plug flow and samples collected and measured as before. After 30 minutes 84 gm of liquid was collected containing 96 weight percent water.

EXAMPLE 4

100 grams of peat containing 76 weight percent water was packed into a 4 cm diameter glass column to a density of 0.70 grams percubic centimeter. 100 grams of methanol and 287 grams of pentane (as separate layers) were drained through the column in plug flow. After 35 minutes, a mixture of 35 grams of water and 8 grams of methanol had been eluted.

EXAMPLE 5

640 grams of peat containing 76 weight percent water was packed into a 5 cm diameter glass column to a density of 0.7 grams per cubic centimeter. 480 grams of methanol was drained through the column in plug flow. 8 pounds of air pressure was applied to the top of the column. After 19 minutes, 316 gm. of liquid was collected containing 97.6 weight percent water.

EXAMPLE 6

200 grams of coal containing 16.5 weight percent water was packed into a 2.5 cm. diameter glass column. 100 grams of methanol was drained through the column in plug flow. 8 pounds of air pressure was applied to the top of the column. After 2 minutes, 7 grams of liquid was collected containing 94.7 weight percent water.

EXAMPLE 7

200 grams of ground corn cobs, prepared with a high speed blender and containing 83.4 weight percent water, were packed into a 2.5 cm. diameter glass column. 140 grams of methanol was drained through the column in plug flow. 8 pounds of air pressure was applied to the top of the column. After 2 minutes, 51 gm. of liquid was collected containing 89 weight percent water.

The separation achieved in the preceding examples is much better then one could hope to achieve with a batch equilibrium exchange extraction process involving conventional back-mix type contacting schemes. The superior separation achieved in the preceding examples using a variety of organic solids shows the process is independent of solid type and not due to preferential attraction for the solvent or water by the solids.

We claim:
1. A method of removing water from an organic solid substrate which comprises:
   (a) contacting the substrate with a solvent such that the substrate and the solvent remain in plug flow during contact to remove at least a large portion of the water therefrom in relatively pure form, and
   (b) separating the substrate from the mixture of solvent and water.
2. The method of claim 1 wherein the solvent is recovered from the mixture of solvent and water and is then recycled.
3. The method of claim 1 wherein the solvent is selected from the group consisting of alcohols, ketones, aldehydes, ethers, carboxylic acids and esters of carboxylic acids, amines, amides, imines, acetonitrile, azirane, azetidine, and other liquids having infinite water miscibility.
4. The method of claim 1 wherein the rate ratio of liquid solvent to water in step (a) is 1:5 to 3:1.
5. The method of claim 1 wherein the organic substrate is peat.
6. A method of removing water from organic solid substrates which comprises:
   (a) contacting the substrate with a primary solvent such that both the substrate and the primary solvent are kept in plug flow during contact to remove at least a large portion of the water therefrom in relatively pure form,
   (b) separating the substrate from the mixture of primary solvent and water,
   (c) contacting the mixture with a secondary solvent which is miscible with the primary solvent but not with water to separate the primary solvent from the water,
   (d) separating the water from the mixture of primary solvent and secondary solvent, and
   (e) separating the primary and secondary solvents.
7. The method of claim 6 wherein the primary solvent is selected from the group consisting of alcohols, ketones, aldehydes, ethers, carboxylic acids and esters of carboxylic acids, amines, amides, imines, acetonitrile, azirane, azetidine, and other liquids having infinite water miscibility.
8. The method of claim 6 wherein the weight ratio of primary solvent to water in step (a) is 1:5 to 3:1.
9. The method of claim 6 wherein the ratio of primary solvent to secondary solvent in step (c) is 2:1 to 1:2.
10. The method of claim 6 wherein the secondary solvent is selected from the group consisting of 1-decanol, octanol, linoleic acid and tributyl phosphate.
11. The method of claim 6 wherein the organic solid substrate is peat.
12. In a method of removing water from organic solid substrates which comrises:
   (a) contacting the substrate with a primary solvent to remove at least a large portion of the water therefrom,
   (b) separating the substrate from the mixture of primary solvent and water,
   (c) contacting the mixture with a secondary solvent which is miscible with the primary solvent but not with water to separate the primary solvent from the water,

(d) separating the water from the mixture of primary solvent and secondary solvent, and (e) separating the primary and secondary solvents, the improvement which comprises keeping the substrate and the primary solvent in plug flow during contact in step (a) so that the water removed from the substrate is in relatively pure form.

13. The method of claim 11 wherein the primary solvent is selected from the group consisting of alcohols, ketones, aldehydes, ethers, carboxylic acids and esters of carboxylic acids, amines, amides, imines, acetonitrile, azirane, azetidine, and other liquids having infinite water miscibility.

14. The method of claim 12 wherein the weight ratio of primary solvent to water in step (a) is 1:5 to 3:1.

15. The method of claim 12 wherein the ratio of primary solvent to secondary solvent in step (c) is 2:1 to 1:2.

16. The method of claim 12 wherein the secondary solvent is selected from the group consisting of 1-decanol, octanol, linoleic acid, and tributyl phosphate.

17. The method of claim 12 wherein the organic solid substrate is peat.

* * * * *